United States Patent Office 3,065,348
Patented Nov. 20, 1962

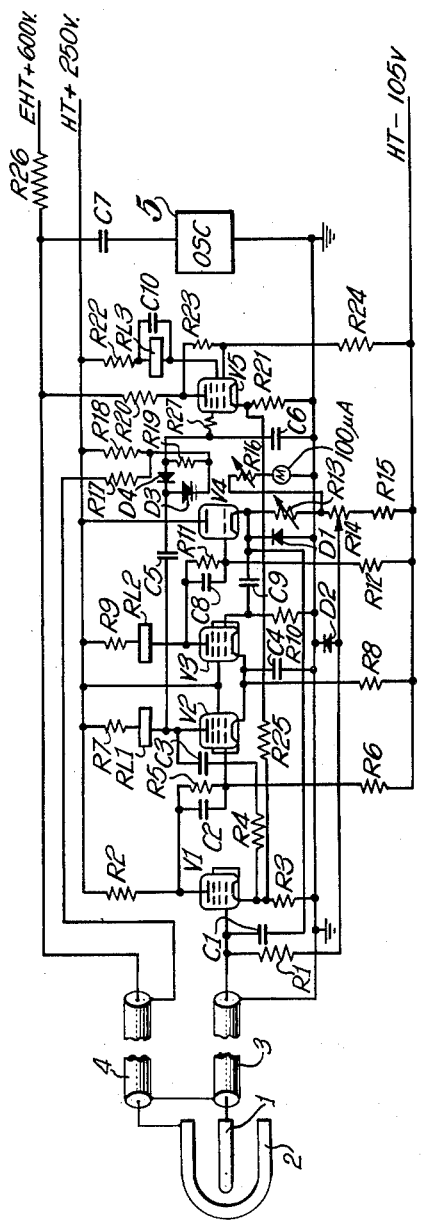

3,065,348
RADIATION MEASURING EQUIPMENT
David Robinson Cockbaine, Harwell, and James Finston Hogg, Wantage, England, assignors to United Kingdom Atomic Energy Authority, London, England
Filed Nov. 17, 1958, Ser. No. 774,515
Claims priority, application Great Britain Nov. 19, 1957
2 Claims. (Cl. 250—83.6)

This invention relates to radiation measuring equipment of the type comprising an ionisation chamber and a D.C. amplifier which measures the current produced in the chamber by the ionising radiation.

Such equipment has one application in measuring the neutron flux in a nuclear reactor, this flux being a measure of the power. As a safety measure, it is customary to arrange that the output of one or more amplifiers operates a circuit which automatically shuts down the reactor if the amplifier output exceeds a preset value corresponding to a power level which the reactor must not exceed. Furthermore, in order to ensure that failure of the equipment itself does not prevent the reactor being shut down in such circumstances, the equipment is made as far as possible to "fail to safe," i.e. failure of the equipment will itself cause the reactor to be shut down.

Two examples of D.C. amplifiers designed to "fail to safe" were described in Paper 434 presented by R. J. Cox and A. B. Gillespie at the 1955 Geneva Conference on the Peaceful Uses of Atomic Energy. There remains the problem of ensuring that the ionisation chamber itself is in an operative condition and that the polarising and input connections between the chamber and the amplifier are intact.

According to the present invention radiation measuring equipment of the type comprising an ionisation chamber and a D.C. amplifier is characterised in that a small A.C. voltage of period small compared with the response time of the amplifier is imposed on the polarising voltage for the chamber whereby a fraction of said A.C. voltage is normally applied to the input of the D.C. amplifier via the interelectrode capacity of the chamber, a corresponding amplified A.C. output from the D.C. amplifier being derived to operate a subsequent circuit, e.g. a fault-indication circuit, whereby said subsequent circuit is operated in the absence of said amplified A.C. output.

Said amplified A.C. output may be rectified to produce a bias voltage for a trip circuit which operates said subsequent circuit.

To enable the nature of the present invention to be more readily understood, attention is directed by way of example to the accompanying drawing, which is a semi-schematic circuit diagram of a preferred embodiment.

In this drawing the inner electrode 1 and outer electrode 2 of an ionisation chamber are connected by co-axial connectors 3 and 4 respectively to a D.C. amplifier of a type described by Cox and Gillespie in the aforementioned paper. Briefly, this amplifier comprises an electrometer valve V1 connected in cascade with a long-tailed pair comprising valves V2 and V3, and a cathode-follower output valve V4. The output, which is taken from a tapping on the cathode resistor of V4, the latter consisting of R13, R14, and R15 in series, is displayed on a meter M, and is fed back from a tapping on R14 to the lower end of the input resistor R1. This second tapping is adjustable to set zero on the meter. Diodes D1 and D2 are connected respectively between the feedback line and earth and the cathode of V4 and earth, and relays RL1 and RL2 are connected in the anode circuits of V2 and V3 respectively. Under normal operating conditions V2 and V3 are both conducting and the cathode of V4 is positive with respect to earth. With a positive polarising voltage on electrode 2, the cathode potential of V4 falls as the ionisation current increases. When this cathode reaches earth potential, D1 conducts and effectively disconnects the feedback line so that V2 is cut off and RL1 de-energised. Any fault leading to a fall in V4 cathode will also cause RL1 to de-energise, while a fault causing the cathode potential to rise will result in D2 conducting, so that the feedback is again disconnected, V3 is cut off and RL2 de-energised. The contacts on RL1 and RL2 are connected in series with a reactor shut-down circuit, so that if either relay is de-energised the reactor is shut down.

The time-constant of the D.C. amplifier is determined by a capacitor C1 connected between the input grid and the cathode of V4. The screen-grid supply for V1, which is separately stabilised, is omitted for simplicity.

Also included in the amplifier unit is an oscillator 5 shown in block schematic form which comprises a conventional triode tuned-grid cathode-coupled oscillator circuit operating at 30 kc./s. This oscillator is transformer-coupled to a potentiometer from which an adjustable output of maximum amplitude about 5 v. R.M.S. can be applied via C7 to the 600 v. EHT polarising line. The latter is fed via a resistor R26 from a conventional EHT supply.

Under typical operating conditions, the interelectrode capacity of the ionisation chamber may be about 40 pfs., and the capacity of the connectors 3 and 4, 2000 pfs. each. Thus the A.C. voltage at the grid of V1 will be about 40/3000 of the voltage impressed on the electrode 2 (for C1=1000 pfs.), and the A.C. voltage applied to the 600 v. line is adjusted to make the input voltage to V1 about 30 mv. The oscillator output is of course attenuated by the capacity of connector 4. Valves V1 and V2 of the D.C. amplifier are also used as an A.C. amplifier for the 30 kc./s. signal. For this purpose a resistor R7 is included in the anode circuit of V2, and an A.C. negative feedback connection comprising capacitor C3 and resistor R4 in series is made between the anode of V2 and the cathode of V1, which has a resistor R3 connected in its lead, to stabilise the A.C. gain at about 330. Resistor R5 is by-passed by capacitor C2 to reduce attenuation by stray capacitance on the grid of V2. Thus an A.C. signal of about 10 v. is produced at the anode of V2. To stop the A.C. signal going beyond V2, the cathodes of V2 and V3 are decoupled to earth by a capacitor C4. Any tendency to instability is reduced by by-passing resistor R11 with capacitor C8 and by providing A.C. negative feedback between the cathode of V4 and the grid of V3 via capacitor C9.

The 10 v. A.C. signal from V2 is applied via a capacitor C5 to a diode-pump rectifier circuit comprising diodes D3 and D4, capacitor C6 and resistor R19. The −10 v. rectified voltage developed across C6, less a 5 v. positive bias developed across R17, which forms with R18 a potentiometer between HT+ and earth, is applied to the suppressor grid of a pentode V5 which is connected in a trip circuit of the type described in the specification of co-pending application Serial No. 677,246, filed August 9, 1957, now abandoned. The suppressor grid base of V5 is short and the anode current is normally cut off by the net voltage of about −5 v. on the suppressor. The control grid potential is determined by a potentiometer comprising the anode resistor R20 and resistors R23 and R24 connected between the anode and HT−, and the cathode current flows to the screen grid, the current being limited by a relay RL3 and a resistor R22 connected in the screen circuit. Thus RL3 is normally energised. If, however, the negative bias derived from the A.C. signal ceases, the anode of V5 conducts, the control grid potential drops, and RL3 is de-energised. The contacts on RL3 may also be connected in series with the reactor shut-down circuit, or may operate a separate fault-indication circuit. The A.C. derived bias would be much reduced or cease if the connections to either the polarising or collecting electrodes of the ion chamber were partially or completely interrupted or short-circuited to earth.

As an additional precaution, the lower end of R17 is not earthed directly, but through the outer braiding of the connectors 3 and 4. The braiding is earthed only at the amplifier end of connector 3. Thus lack of braiding continuity, or failure to earth the braiding, will also result in RL3 being de-energised. The anode resistor R20 is connected to the 600 v. EHT line rather than to HT+, so that failure of the EHT supply also causes RL3 to de-energise.

A feedback resistor R25 is connected between the cathodes of V5 and V1 and has the following function. When operating normally with a large input current, so that the circuit is about to trip, V2 is tending to cut off, and the A.C. gain of V1 and V2 is thus reduced despite the feedback between them. This results in a smaller negative bias on the suppressor grid of V5, which therefore tends to trip. When V5 trips, the current it takes is reduced and the HT tends to rise slightly, thus increasing the gain of V1 and V2 so that V5 is cut off again. Thus relay RL3 will tend to chatter near the trip condition. The feedback connection between V5 and V1 ensures that when V5 trips and its cathode potential falls, the cathode potential of V1 will also fall slightly, causing a net reduction in the A.C. gain of V1 and V2 and thus eliminating the tendency of RL3 to chatter.

Component values in the described embodiment are

| | | | |
|---|---|---|---|
| R 1 | $10^9$–50M [1] | R15 | 18K |
| R 2 | 220K | R16 | 100K |
| R 3 | 100 | R17 | 10K |
| R 4 | 33K | R18 | 470K |
| R 5 | 1.8M | R19 | 470K |
| R 6 | 3.3M | R20 | 4.7M |
| R 7 | 4.7K | R21 | 470 |
| R 8 | 5.6K | R22 | 15K |
| R 9 | 10K | R23 | 3.3M |
| R10 | 47K | R24 | 2.2M |
| R11 | 330K | R25 | 4.7K |
| R12 | 470K | R26 | 47K |
| R13 | 5K | R27 | 330K |
| R14 | 1K | | |

[1] Depending on range.

| | | |
|---|---|---|
| C1 | μf | 0.001 |
| C2 | pf | 470 |
| C3 | μf | 0.5 |
| C4 | μf | 1.0 |
| C5 | pf | 470 |
| C6 | μf | 1.0 |
| C7 | μf | 0.01 |
| C8 | pf | 470 |
| C9 | μf | 0.01 |
| C10 | μf | 0.25 |

We claim:

1. Radiation measuring equipment comprising an ionization chamber having at least two electrodes, a D.C. amplifier having input and output terminals, a D.C. polarising voltage source, a first connection between the polarising voltage source and one electrode, a second connection between the amplifier input terminal and the other electrode, an A.C. voltage source, a connection between the A.C. voltage source and the first connection whereby an A.C. voltage is applied to said one electrode via the first connection, a fraction of the A.C. voltage thereby being applied to the input terminal via the interelectrode capacity of the chamber, means for deriving an amplified A.C. output from the D.C. amplifier, filter means for preventing the amplified A.C. reaching the output terminal of the amplifier, a circuit responsive to the amplitude of the A.C. output, and a connection for applying the A.C. output to the responsive circuit.

2. Equipment as claimed in claim 1 wherein the responsive circuit is a trip circuit and the last-mentioned connection comprises means for rectifying the A.C. output to produce a D.C. control voltage for the trip circuit.

References Cited in the file of this patent

UNITED STATES PATENTS

| 2,646,556 | Allen | July 21, 1953 |
| 2,721,276 | Exner | Oct. 18, 1955 |
| 2,741,592 | Borst et al. | Apr. 10, 1956 |

OTHER REFERENCES

Neutron Flux Instrumentation System for Reactor Safety and Control, by Cox et al., Geneva Conference on Peaceful Uses of Atomic Energy, 1955, vol. 5, page 393 to end of article.